United States Patent [19]

Hanley

[11] 4,318,590
[45] Mar. 9, 1982

[54] WIDE SCAN REARVIEW MIRROR

[76] Inventor: William W. Hanley, Rte. 1, Box 353, Grove, Okla. 74344

[21] Appl. No.: 125,494

[22] Filed: Feb. 28, 1980

Related U.S. Application Data

[63] Continuation-in-part of Ser. No. 893,283, Apr. 5, 1978, abandoned.

[51] Int. Cl.³ .............................................. B60R 1/08
[52] U.S. Cl. .................................................. 350/289
[58] Field of Search ......................... 350/6.6, 281, 289

[56] References Cited

U.S. PATENT DOCUMENTS

| | | | |
|---|---|---|---|
| 3,063,342 | 11/1962 | Zeek | 350/6.6 |
| 3,575,496 | 4/1971 | Pollack et al. | 350/289 |
| 3,650,607 | 3/1972 | Rogers et al. | 350/289 |
| 3,799,658 | 3/1974 | Pignatelli | 350/289 |
| 4,105,301 | 8/1978 | Doeg | 350/289 |
| 4,159,866 | 7/1979 | Wunsch et al. | 350/289 |

FOREIGN PATENT DOCUMENTS 1021429  3/1961  United Kingdom ............... 350/281

Primary Examiner—F. L. Evans
Attorney, Agent, or Firm—Head & Johnson

[57] ABSTRACT

A scanning rearview mirror for vehicles and comprising a substantially universally pivotal mirror operably connected with the electrical system of the vehicle for automatically scanning through a horizontal scan pattern to reduce or eliminate blind spots during a driving operation, and through a vertical span pattern for facilitating visual inspection of the vehicle tires from a vantage point within the vehicle, either when the vehicle is moving or at a standstill.

8 Claims, 7 Drawing Figures

WIDE SCAN REARVIEW MIRROR

CROSS REFERENCE TO RELATED APPLICATION

This application is a continuation-in-part of my copending application, Ser. No. 893,283, filed Apr. 5, 1978 and entitled WIDE SCAN REARVIEW MIRROR, now abandoned.

BACKGROUND OF THE INVENTION

1. Field of the Invention

This invention relates to improvements in rearview mirrors for vehicles and more particularly, but not by way of limitation, to a wide scanning mirror for facilitating rear vision by the operator or passenger in a vehicle.

2. Description of the Prior Art

It is very important to provide unimpeded rear vision for the driver of a vehicle for safety purposes during the operation of the vehicle. Of course, an internal rearview mirror mounted in the proximity of the windshield of the vehicle is standard equipment in vehicles today and provide a certain amount of rear vision for the operator of the vehicle. In addition, externally mounted rearview mirrors, on both the driver's side and passenger's side of the vehicle, are in widespread use today to provide an even greater visible area for the driver or operator of the vehicle. However, even with these additional rearview mirrors, there are still great areas, commonly known as blind spots, wherein the driver's vision is blocked in the rearward direction, thus creating a safety hazard during the operation of the vehicle.

In order to reduce the blind spots, oscillatory type rearview mirrors have been developed, such as that shown in the Simmons U.S. Pat. No. 3,199,075, issued Aug. 3, 1965, and entitled "SIGNAL CONTROLLED ADJUSTABLE REARVIEW MIRROR" These devices are normally provided with mirrors which may be pivoted about a substantially vertical axis for increasing the width of the overall visible area for the driver of the vehicle. However, these devices actually eliminate one blind spot which simultaneously creates another blind spot, the disadvantages of which will be readily apparent.

SUMMARY OF THE INVENTION

The present invention contemplates a scanning rearview mirror for vehicles and which is particularly designed and constructed for overcoming the foregoing disadvantages. The novel mirror assembly comprises a mirror mounted within a housing which is particularly adapted for installation on the exterior of the vehicle in the proximity of the driver's side or passenger's side as desired. The mirror is pivotally mounted within the housing for substantially universal pivoting whereby both a horizontal scanning pattern and a vertical scanning pattern may be provided as required during operation of the vehicle. An operator mechanism is operably connected between the electrical system of the vehicle and the mirror for automatically pivoting the mirror through the horizontal scanning pattern when the turn signals of the vehicle are energized. The mirror oscillates continuously through the horizontal pattern in such a manner that a wide angle area of vision is provided for the operator of the vehicle without substituting one blind spot for another during operation of the novel mirror apparatus. This facilitates the safe operation of the vehicle, particularly during a turning operation when the vehicle is moving, or when the vehicle is changing modes of operation, such as changing driving lanes, moving away from a curb, or the like. In addition, the mirror may be selectively rotated through a substantially vertical scanning pattern upon the control of the driver in such a manner that the condition of the vehicle tires may be visually ascertained from a vantage point within the interior of the vehicle. This is particularly important in the operation of large trucks, and the like, having dual tires. The condition of the dual tires may be ascertained while the vehicle is in motion, or when the vehicle is at a standstill. The novel mirror apparatus is simple and efficient in operation and economical and durable in construction.

DETAILED DESCRIPTION OF THE PREFERRED EMBODIMENT

Figure 2:
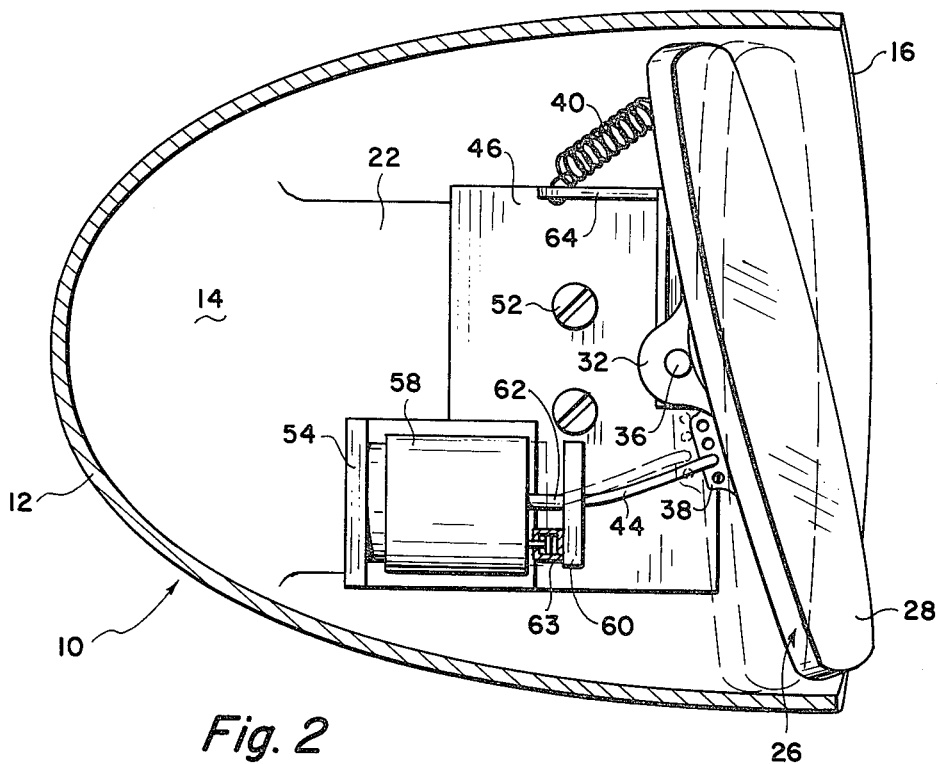
FIG. 2 is a sectional view taken on line 2—2 of FIG. 1, with portions shown in elevation for purposes of limitation.

Referring to the drawings in detail, reference character 10 generally indicates a scanning mirror comprising an outer housing 12 having a chamber 14 therein open at one end 16 thereof. The housing 12 is suitably secured to a mounting bracket 18 of any suitable type which is adapted for mounting or installation on the exterior of a vehicle 20 in the usual or well-known manner (not shown). A mounting platform or base 22 is provided on the inner periphery of the housing 12 and is preferably integral therewith, but not limited thereto, and removably supports a mirror assembly generally indicated at 24 in a manner as will be hereinafter set forth.

Figure 1:
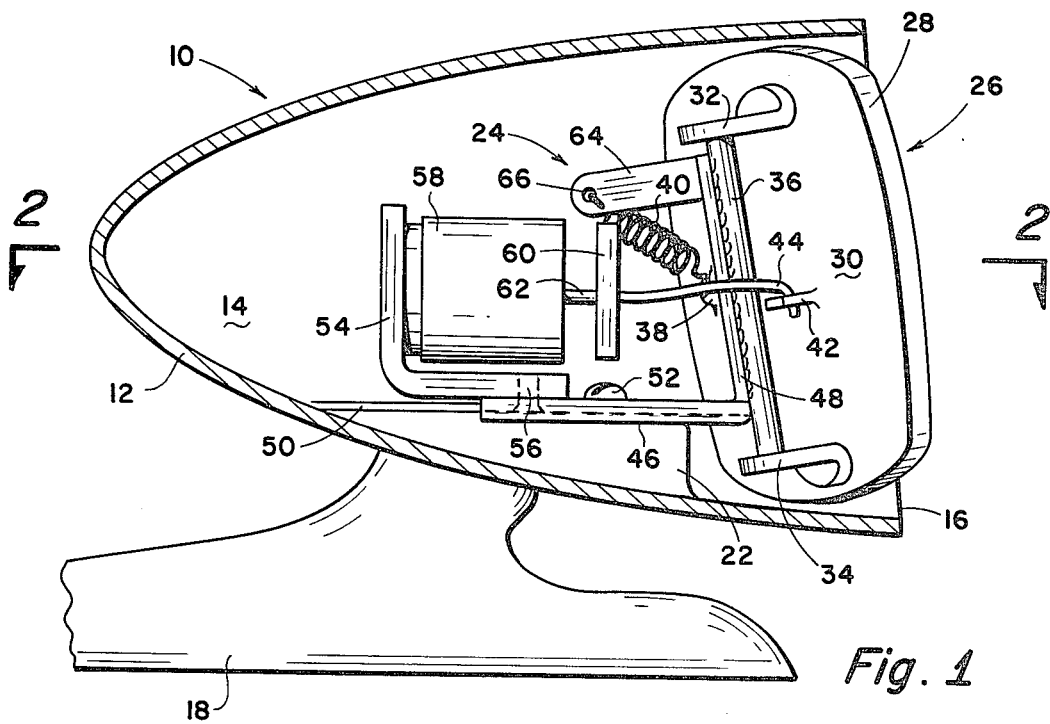
FIG. 1 is a sectional elevational view of a scanning mirror embodying the invention, with portions shown in elevation for purposes of illustration.

The mirror assembly 24 comprises a suitable mirror element 26 having one reflective face 28 open or exposed through the open end 16 of the housing 12 as particularly shown in FIGS. 1 and 2. The opposite face 30 of the mirror element 26 is preferably a metallic plate, and is provided with a pair of spaced brackets 32 and 34 having a pivot shaft 36 suitable journalled therebetween for rotation about its own longitudinal axis, as will be hereinafter set forth in detail. The pivot shaft 36 extends longitudinally through a bearing sleeve 37 interposed between the brackets 32 and 34. In addition, a relatively small, apertured boss 38 (FIG. 1) is provided on the plate 30 and spaced slightly from one side of the pivot shaft 36 for receiving one end of a suitable helical spring 40 therein. An apertured flange 42 is also provided on the plate 30 spaced from the opposite side of the pivot shaft 36 with respect to the boss 38 for receiving one end of a tie bar 44 therein for a purpose as will be hereinafter set forth.

A bracket member 46 having an angularly disposed brace member 48 is welded or otherwise secured to the outer periphery of the bearing sleeve and extends outwardly therefrom in an opposite direction with respect to the mirror 26. The bracket 46 is preferably provided with oppositely disposed side rails (not shown) on the outer edges thereof for slidable engagement with the side edges 50 of the base 22 for facilitating disposition of the bracket 46 on the base 22. In addition, the bracket 46 is preferably removably secured in position on the base 22 by a plurality of screws 52, or the like, thus removably securing the mirror element 26 to the base 22.

A substantially L-shaped bracket member 54 is secured to the upper surface of the bracket 46 in any suitable manner, such as by screws 56 and is disposed in spaced relation to the mirror element 26 as clearly shown in the drawings. An electric magnet or solenoid 58 is suitably mounted on the bracket 54 and extends outwardly therefrom in a direction toward the mirror element 26. A plate member 60 is secured at the outer end of the actuator member 62 of the solenoid 58 in any suitable manner and the opposite end of the tie bar 44 is rigidly secured to the plate 60 for movement simultaneously therewith. If desired, a suitable dash plate 63 may be secured between the solenoid 58 and plate 60 for damping the movement of the mirror 26 during operation thereof as will be hereinafter set forth. In addition, an arm member 64 is rigidly secured to the brace member 48 and extends outwardly therefrom in a direction away from the mirror element 26. The arm member 64 is provided with an aperture 66 in the proximity of the outer end thereof for receiving the opposite end of the spring 40 therein, thus anchoring the spring 40 between the mirror element 26 and the bracket 46.

The arm 62 of the solenoid 58 is normally in an extended position as shown in the drawings when the solenoid 58 is not energized, and the force of the spring 40 normally retains the mirror 26 pivoted in a counterclockwise direction about the axis of the pivot shaft 36, as particularly shown in FIG. 2. Of course, the angular relationship of the mirror element 26 when disposed in this normal position therefor may be adjusted as desired or required by the operator of the vehicle by the adjustment of the housing 12 with respect to the mounting bracket 18 in the usual manner which is well known. During operation of the scanning mirror apparatus 10 the solenoid 58 is intermittently activated, as will be hereinafter set forth, and when the solenoid 58 is activated or energized, the arm 62 is retracted. This pulls the tie bar 44 in a left-hand direction as viewed in the drawings and overcomes the force of the spring 40 for pivoting the mirror element 26 in a clockwise direction about the axis of the pivot shaft 36, as viewed in FIG. 2. As the mirror element 26 moves through this substantially horizontal scanning path, a relatively wide scanning area is visible in a rearward direction for the operator of the vehicle 20.

As soon as the solenoid 58 is de-energized, the arm 62 is extended or moves to its normal extended position and the spring 40 cooperates therewith for returning the mirror element 26 to its normal clockwise position therefor. During repeated periods of alternate energization and de-energization of the solenoid 58 the mirror element 26 is constantly moved to and fro through the substantially horizontal scanning path, providing a substantially constant viewing in a rearward direction through a relatively wide angle of vision.

Figure 3:
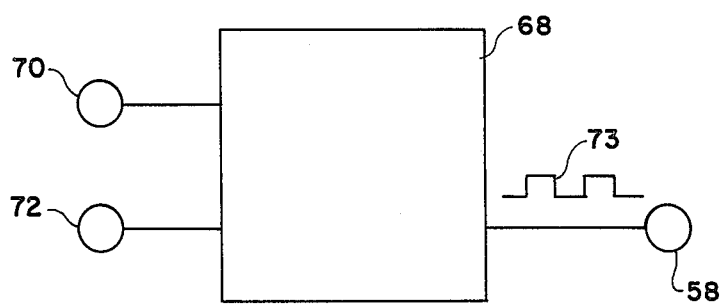
FIG. 3 is a schematic view of the electrical circuit for a system utilizing a scanning mirror embodying the invention.

Referring now to FIG. 3, a block diagram illustrating a proposed electrical connection for a scanning mirror embodying the invention is shown. Suitable electrical elements indicated by the block 68 are operably connected with the battery 70 of the vehicle 20 and with the usual turn signals 72 of the vehicle, and with the solenoid or electric magnet 58 whereby electrical current is supplied from the battery 70 to the solenoid 58 upon actuation of the turn signals 72 in the usual manner. The electrical elements 68 include a suitable timing device wherein the solenoid 58 is automatically energized for one second and de-energized for one second (or substantially any other desired time cycle intervals) during the time that the turn signals 72 are activated. This provides an image in the mirror 26 of two complete fields of view. The length of the travel of the mirror 26 is limited in such a manner that both fields of view overlap to assure there is no blind spot between the two fields of vision. Of course, it is also preferable to include a manual switch in the electrical elements 68 operable independently of the turn signals 72 in order that the operator of the vehicle 20 may selectively activate the scanning action of the mirror 26 at times when the turn signals 72 are not needed.

Figure 4:
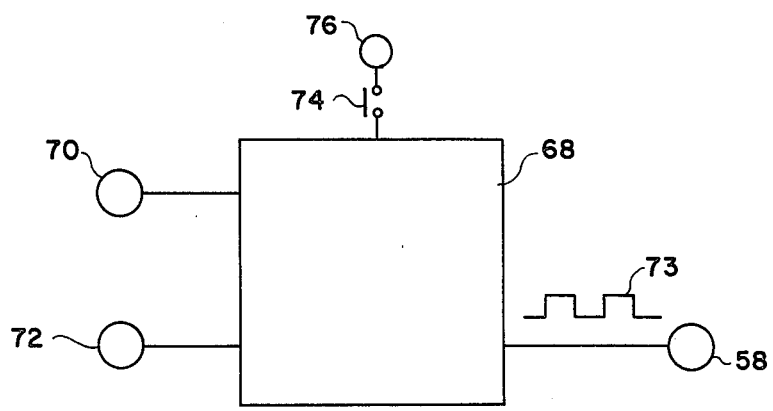
FIG. 4 is a schematic view of the electrical circuit for a modified scanning mirror system.
Figure 7:
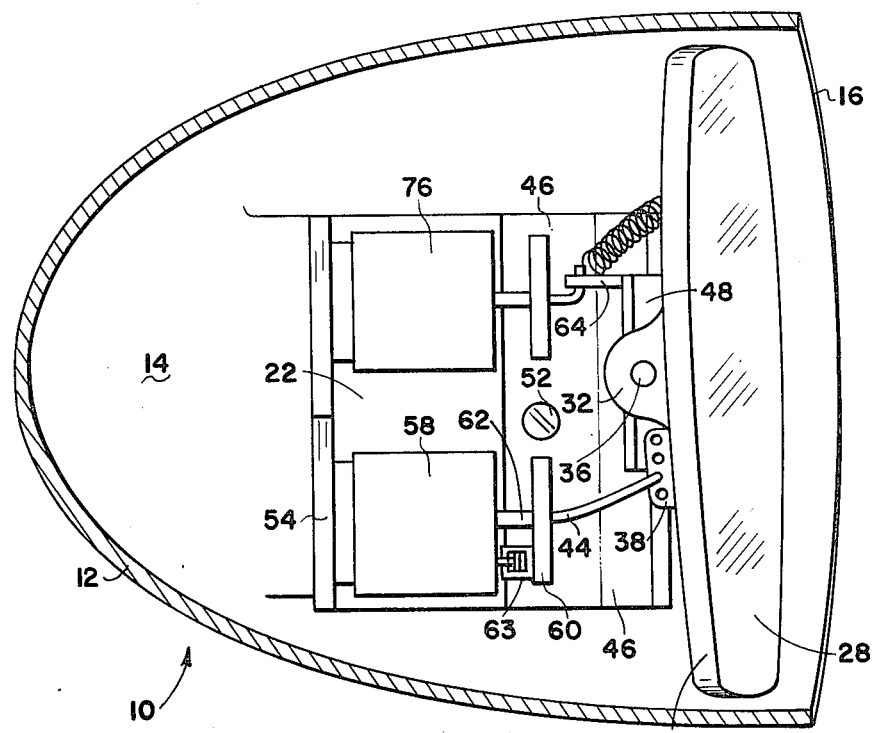
FIG. 7 is a sectional view taken on line 7—7 of FIG. 6.
Figure 6:
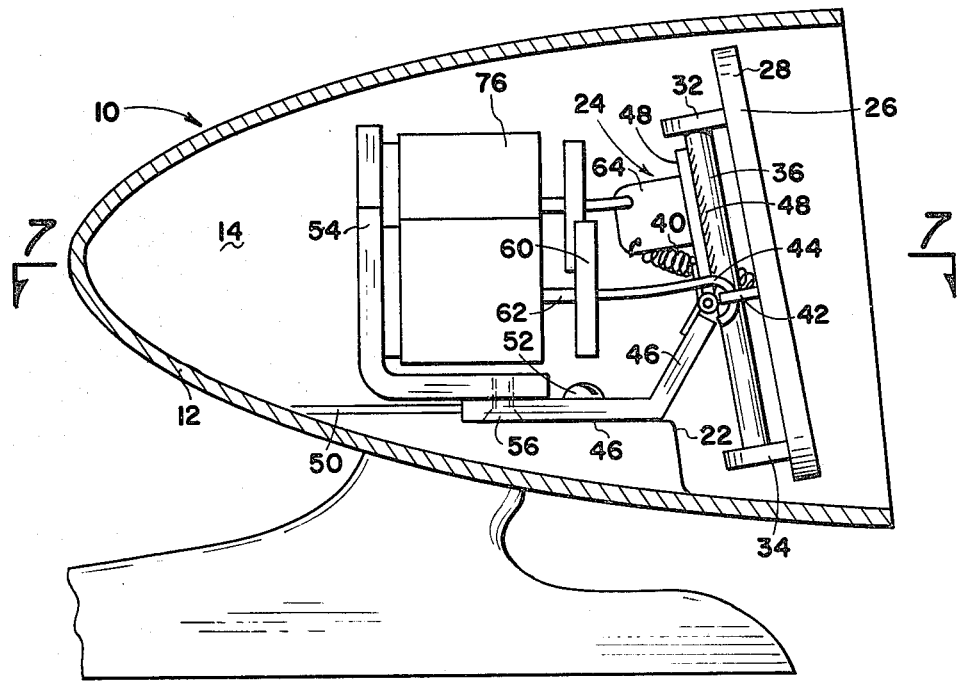
FIG. 6 is a sectional elevational view of a modified scanning mirror embodying the invention.

Referring to FIG. 4, a block diagram is shown illustrating a proposed electrical connection for a modified scanning mirror embodying the invention and shown in FIGS. 6 and 7. In this embodiment, a manual normally "off" push button switch 74, or the like, is operably connected between the electrical elements 68 and a second electric magnet or solenoid 76. The second electric magnet or solenoid 76. The second solenoid 76 may be mounted in the housing 12 in such a manner that the mirror element 26 may be moved about a substantially horizontal axis upon actuation of the solenoid 76. In this instance, the brace 48 may be hingedly secured to the mounting bracket 46 by a suitable spring urged hinge (not shown) or the like, whereby the mirror element 26 may be pivoted about the axis of the hinge. Normally, there is no need for a timing cycle for the pivoting of the mirror 26 about the horizontal axis since this operation is manually controlled for particular scanning or viewing of specific items, such as for an inspection of the vehicle tires, or the like, and the time required for the inspection operation may vary, and thus may be controlled manually by the actuation of the push button switch 74.

Figure 5:
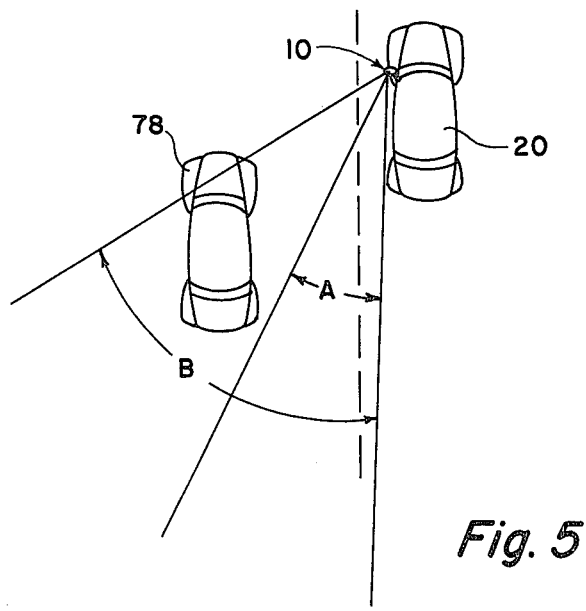
FIG. 5 is a schematic view illustrating the operation of a scanning mirror embodying the invention.

As will be seen in FIG. 5, when the vehicle 20 is moving or travelling in a forward direction and the scanning mirror is in the normal position thereof, the rearview visibility of the operator of the vehicle will normally be as indicated by the Angle A. When it is desirable to increase the angle of vision to that as shown by the Angle B for any reason, such as upon the approach of a second vehicle 78, the manual switch may be actuated for manually moving the mirror element through the horizontal scanning pattern between the position shown in solid lines in FIG. 2 and the position shown in broken lines therein. Of course, in instances wherein the vehicle 20 is to change direction of travel, change driving lanes, or the like, the turn signals 72 may be activated in the usual manner and the horizontal scanning pattern for the mirror element 26 is automatically initiated.

From the foregoing it will be apparent that the present invention provides a novel wide angle scanning mirror for increasing the angular visibility in a rearward direction for the operator of a vehicle. The scanning mirror may also be selectively moved through a substantially vertical scanning pattern for providing a visual inspection of portions of the vehicle not normally visible from the interior thereof, such as the vehicle tires.

What is claimed is:

1. A scanning rearview mirror for a vehicle and which comprises housing means adapted for installation on the vehicle, universally pivotal mirror element means, mounting means securing the mirror element means within the housing, centrally disposed pivot means secured on one face of the mirror element means and extending substantially vertically to provide for pivotal movement of the mirror element means in at least one direction, spring means operably connected between the mounting means and the mirror element means for constantly urging the mirror element in one pivotal direction, solenoid means operably connected between the electrical system of the vehicle and the mirror element means for selective intermittent pivoting of the mirror element means against the force of the spring means to provide a substantially horizontal scanning pattern for the mirror element means, said mounting means being removably engageable with the housing means for removably securing the mirror element means therein.

2. A scanning rearview mirror as set forth in claim 1 and including dash pot means operably connected between the solenoid means and pivotal mirror element means for damping the pivotal movement of the mirror element means.

3. A scanning rearview mirror as set forth in claim 1 and including second solenoid means connected between the electrical system of the vehicle and the pivotal mirror element means and independently operable for pivoting of the mirror element means through a substantially vertical scanning pattern.

4. A scanning rearview mirror as set forth in claim 1 wherein the mirror element means comprises a mirror having one face thereof constructed of a reflecting material and the opposite face thereof of a rigid material, said pivot means comprising a pivot shaft, a bearing sleeve concentrically disposed around the outer periphery of the pivot shaft and secured to the rigid material face, and the mounting means comprises mounting bracket means rigidly secured to the bearing sleeve and removably engagable with the housing means, said scanning pattern comprising a to and fro movement providing constantly overlapping viewing areas in a rearward direction for the operator of the vehicle.

5. A scanning rearview mirror as set forth in claim 4 and including second bracket means secured to the first mounting bracket means for supporting the solenoid means in spaced relation to the pivotal mirror element means, tie bar means operably connected between the solenoid means and rigid material face for transmitting movement to the mirror element means upon activation of the solenoid means.

6. A scanning rearview mirror as set forth in claim 5 wherein the tie means is connected with the rigid material face slightly spaced from one side of the pivot shaft means, and the spring means is operably connected to the rigid material face in spaced relation from the side of the pivot shaft means oppositely disposed from the tie bar means for cooperating therewith to provide said scanning action for the mirror element means.

7. A scanning rearview mirror for a vehicle and comprising a mirror element having the outer face thereof constructed of a reflective material, bearing sleeve means secured to the center of the inner face of the mirror element, pivot shaft means rotatably supported in the bearing sleeve means for rotation about its own longitudinal axis, bracket means rigidly secured to the bearing sleeve means for supporting the mirror element, solenoid means carried by the bracket means and intermittently operable for transmitting motion to the mirror element, tie rod means operably connected between the solenoid means and the mirror element and spaced to one side of the pivot shaft means for pivoting the mirror element in one direction upon activation of the solenoid means, spring means operably connected between the bracket means and the mirror element and spaced to one side of the pivot shaft means oppositely disposed with respect to the tie rod means for constantly uring the mirror element in an opposite pivotal direction, said solenoid means and spring means cooperating to provide a scanning pattern of movement for the mirror element and having constantly overlapping viewing areas in a reflective direction away from the outer face of the mirror element, and including second solenoid means connected with the mirror element and independently operable for pivoting the mirror element through a scanning pattern substantially perpendicularly disposed with respect to the first scanning pattern.

8. A scanning rearview mirror for a vehicle as set forth in claim 7 and including dash pot means operably connected between the solenoid means and mirror element for damping the movement of the mirror element.

* * * * *